United States Patent [19]

Bandhopadhyay et al.

[11] Patent Number: 4,930,348
[45] Date of Patent: Jun. 5, 1990

[54] VERTICAL BALANCING MACHINE WITH CARTRIDGE ASSEMBLY

[75] Inventors: Deb K. Bandhopadhyay, Rochester Hills; Thomas A. Greenlees, Troy; David L. Rubbelke, Rochester Hills, all of Mich.

[73] Assignee: Balance Engineering Corporation, Troy, Mich.

[21] Appl. No.: 276,027

[22] Filed: Nov. 25, 1988

[51] Int. Cl.$^5$ .......................... G01M 1/04; G01M 1/22
[52] U.S. Cl. ..................................................... 73/472
[58] Field of Search .................... 73/66, 460, 462, 471, 73/472

[56] References Cited

U.S. PATENT DOCUMENTS

| | | | |
|---|---|---|---|
| 3,130,587 | 4/1964 | Kinsey et al. | 73/462 |
| 3,832,905 | 9/1974 | Himmler et al. | 73/472 |
| 4,031,760 | 6/1977 | Muller | 73/460 |
| 4,094,198 | 6/1978 | Moulinoux | 73/460 |
| 4,635,481 | 1/1987 | Curchod | 73/460 |

FOREIGN PATENT DOCUMENTS 56-36032  4/1981  Japan ..................................... 73/460

*Primary Examiner*—John Chapman
*Attorney, Agent, or Firm*—Reising, Ethington, Barnard, Perry & Milton

[57] ABSTRACT

A vertical, hard suspension, two plane balancing machine has a suspension cartridge which drops into an aperture in a support plate of the machine base, and a spindle cartridge which slides snugly into bores in the suspension cartridge. The suspension cartridge has two vertically spaced and rigidly interconnected plates, each plate having a bore for the spindle cartridge and having a pair of arcuate slots concentric with the bore defining between the slot ends a pair of resilient webs comprising the machine flexure elements located diametrically on each side of the bore. A force transducer is located in a slot of each plate to measure vibration. The spindle cartridge has a rigid tube containing vertically spaced bearings which rotatably support the spindle. A motor coupled to the spindle through a belt drive is located in the same plane as the webs to minimize the effects of the belt drive forces on the force transducer.

7 Claims, 4 Drawing Sheets

VERTICAL BALANCING MACHINE WITH CARTRIDGE ASSEMBLY

FIELD OF THE INVENTION

This invention relates to a vertical balancing machine and particularly to a balancing machine having a cartridge assembly for the suspension and/or the spindle.

BACKGROUND OF THE INVENTION

Vertical balancing machines are commonly used to test a rotary part for unbalance by rotating the part about a vertical axis and measuring the vibrational forces which occur when the part is not balanced. A motor driven vertical spindle holds the part for rotation and the spindle is mounted on a suspension with a predetermined spring rate so that for a given sprung mass a known resonant frequency is established. The part is driven at a rate much lower than the resonant frequency in the case of a hard suspension or at a rate much higher than the resonant frequency in the case of a soft suspension. The present invention is particularly directed to a hard suspension machine although the principle of the machine can be adapted to a soft suspension.

Where the balancing machine is used as a universal machine, i.e., adapted to process a wide range of different parts, it is useful to replace a suspension or a spindle to provide a drive for a certain class of parts to be balanced. It is also useful, even in special purpose machines, to be able to remove the spindle or the suspension from the machine base for service of the bearings or the like. In addition, the manufacture of such balancing equipment would be facilitated by a structure which features simplicity of assembly. Usually such machines are not constructed in a manner to allow quick and easy removal and replacement. On the other hand, machines of simple structure have been known in the art, for example that shown in U.S. Pat. No. 3,130,587 to Kinsey et al. That patent has a suspension and spindle assembly which is secured as a unit to an apertured horizontal support plate. Only a drive shaft and unbalance pickup means extend through the aperture. The transducers are separate from the unit and are attached directly to the support plate.

SUMMARY OF THE INVENTION

It is therefore an object of the invention to provide a balancing machine with a modular construction for easy removal and replacement of subassemblies. It is a further object to provide such a machine with cartridge units for suspension and spindle subassemblies.

The invention is carried out by a vertical balancing machine comprising; a base carrying a horizontal support plate having an aperture, a suspension cartridge secured to the support plate for assembly and removal as a unit and at least in part depending through the aperture, the suspension cartridge having a pair of vertically spaced, rigidly interconnected suspension elements, each suspension element having an associated transducer for sensing unbalance signals, and a vertical spindle journaled in the suspension elements, and motor means supported on the base in driving relation to the spindle.

The invention further comprehends a spindle cartridge slidably received within the suspension cartridge for assembly and removal as a unit.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The description of the invention is directed to the preferred embodiment which is a vertical, hard suspension, two plane, universal balancing machine; however, those skilled in the art will appreciate that the concepts of the invention may be applied to other balancing machines. The machine is useful for both dynamic and static unbalance measurements.

Figure 1:
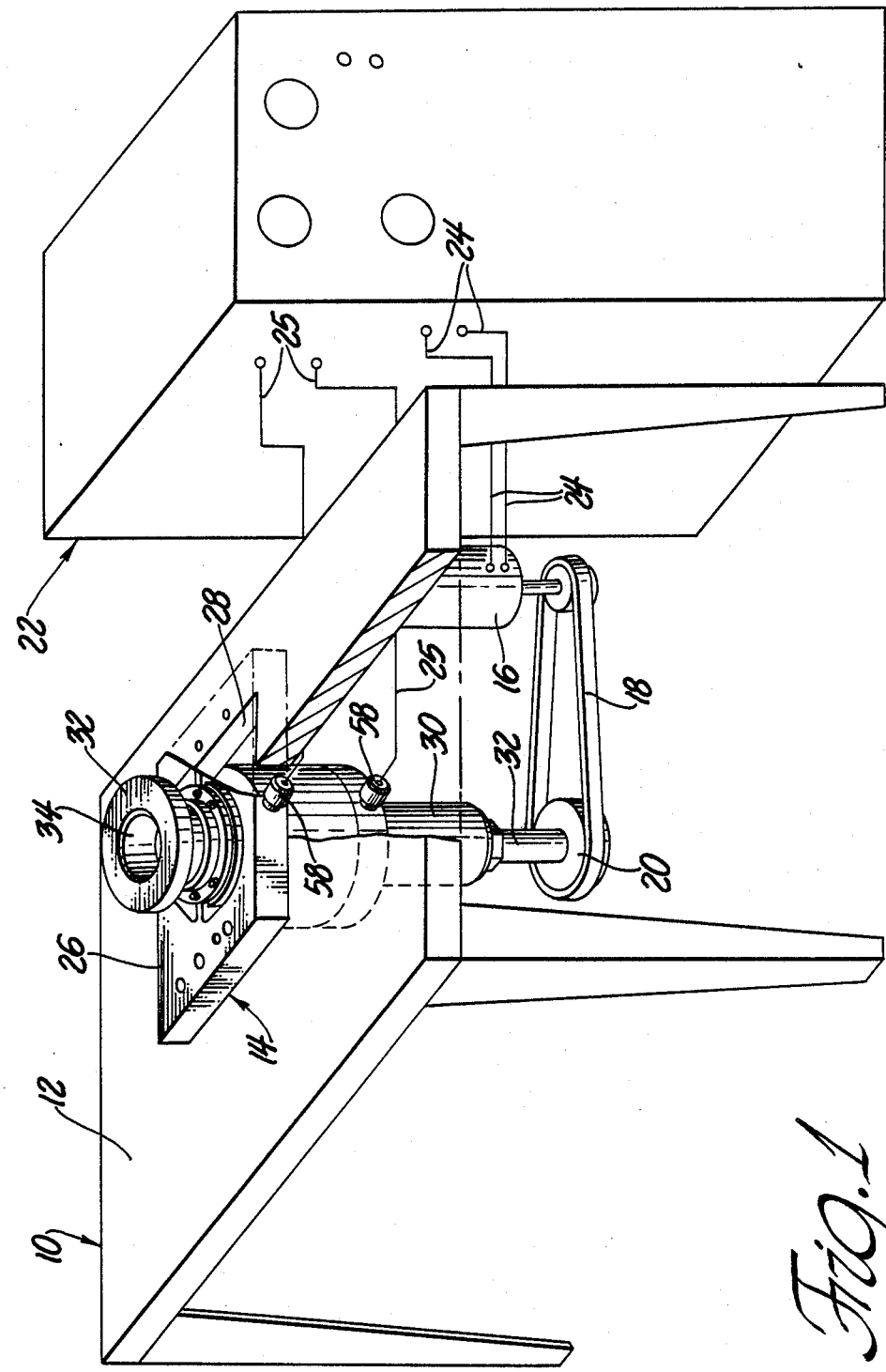
FIG. 1 is a partly broken away isometric view of a vertical balancing machine according to the invention.
Figure 2:
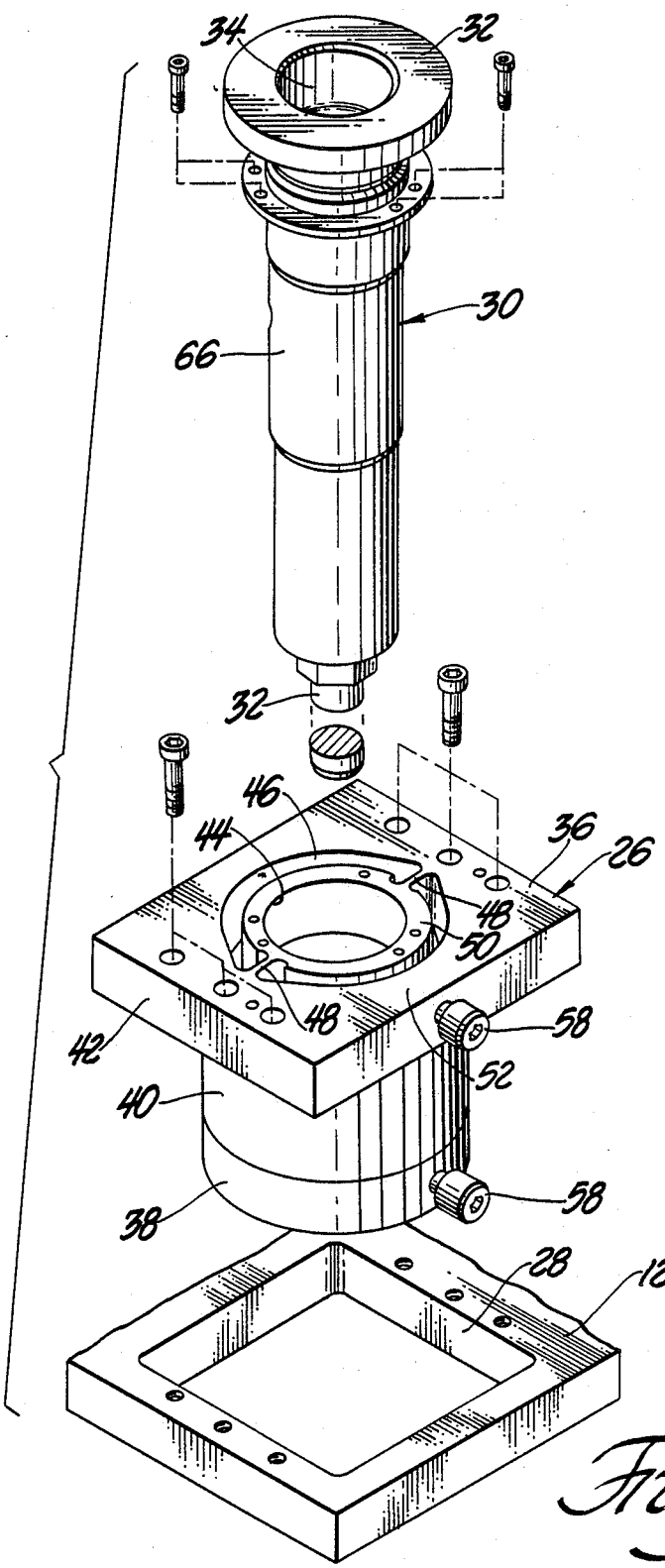
FIG. 2 is an exploded isometric view of the machine of FIG. 1.

Referring to FIG. 1, a vertical balancing machine has a base 10 having a horizontal mounting plate 12 which carries the balancing mechanism 14 and a motor 16 for driving the mechanism 14 through a belt 18 and pulleys 20. A controller and analyzer 22 is connected through electrical conductors 24 and 25 to the motor 16 and to electrical outputs, respectively, of the balancing mechanism 14. The mechanism 14, as best shown in the exploded view of FIG. 2, comprises a suspension cartridge 26 which bolts onto the mounting plate 12 and depends through a rectangular aperture 28 in the mounting plate, and a spindle cartridge 30 of generally cylindrical shape which snugly fits into an opening in the suspension cartridge 26 and is also bolted in place. A spindle 32 comprises the highest part of the spindle cartridge 30 and has a central recess 34 for receiving a chuck, not shown. The spindle 32 also comprises the lowest part of the spindle cartridge 30 as a shaft portion which carries a pulley 20.

Figure 3:
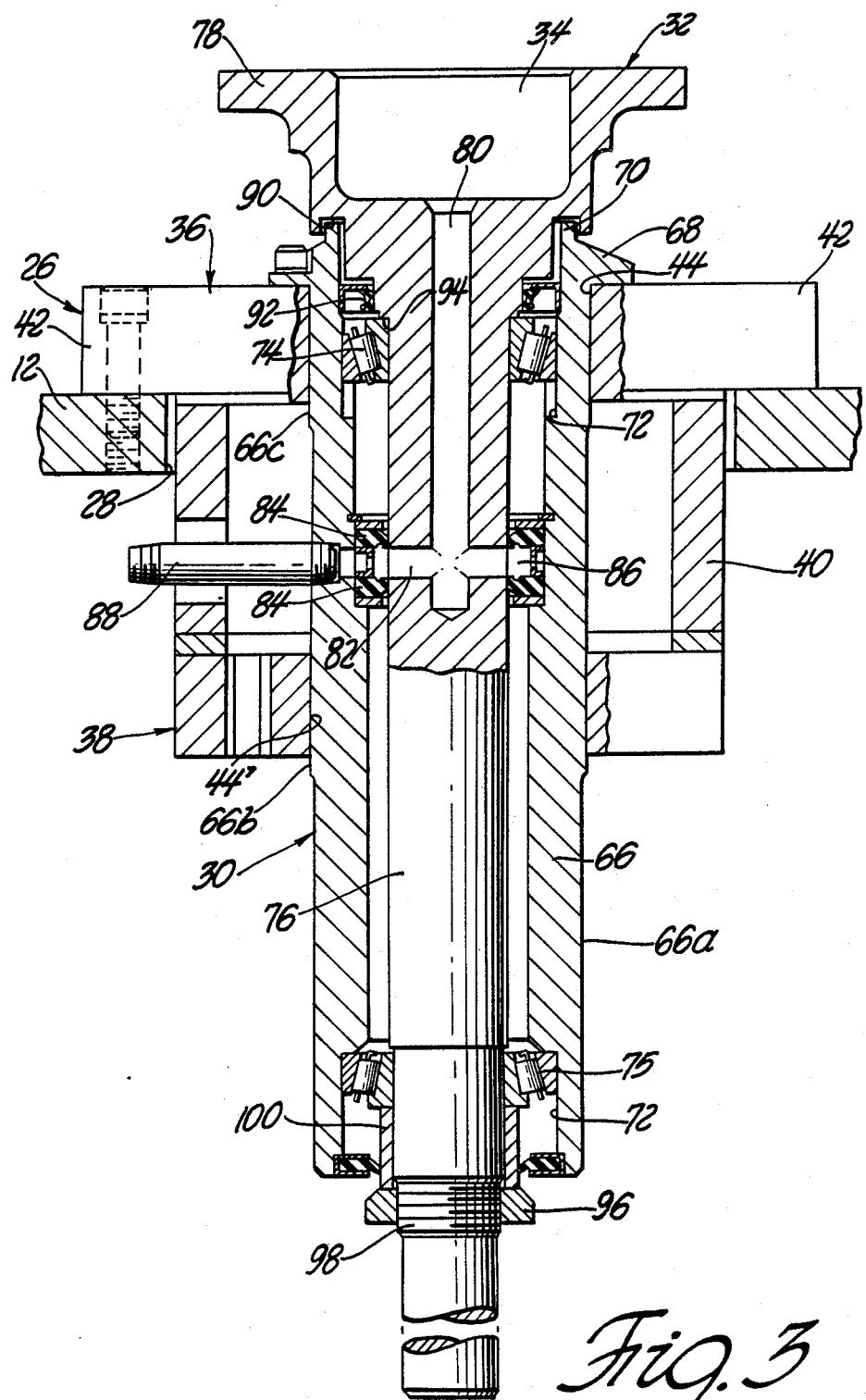
FIG. 3 is a vertical cross sectional view of the machine of FIG. 1 according to the invention.
Figure 4:
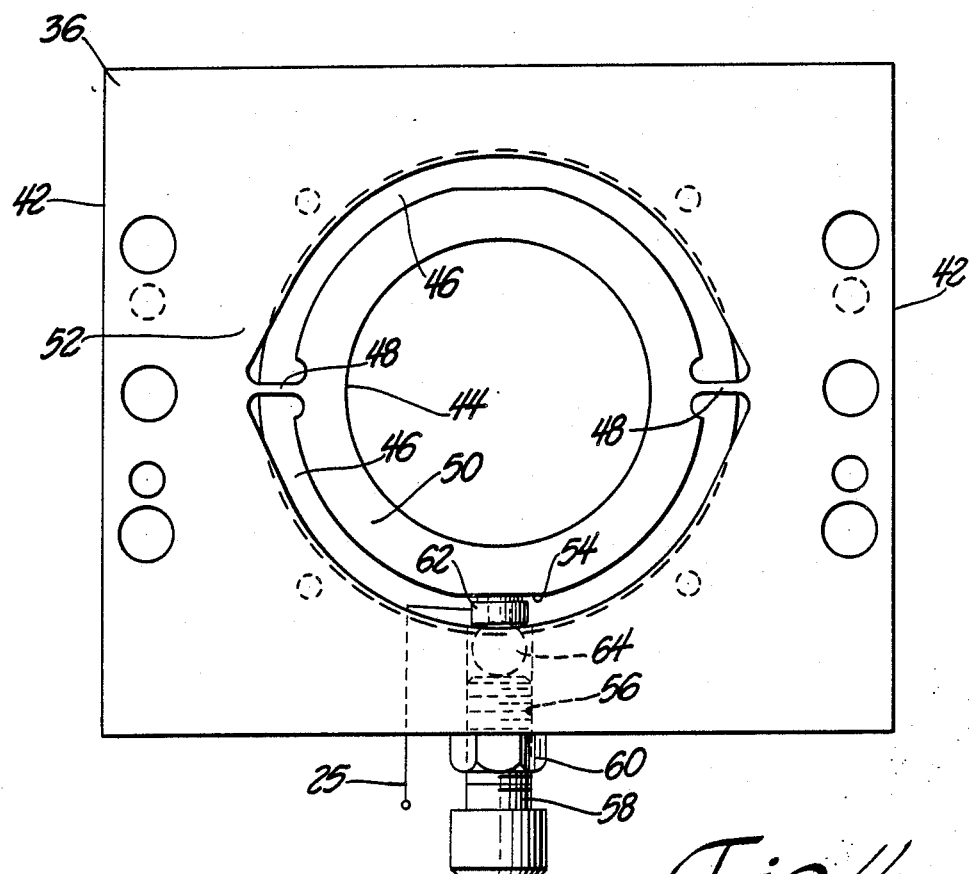
FIG. 4 is a top view of the upper suspension element of the suspension Cartridge of FIG. 1 according to the invention.
Figure 5:
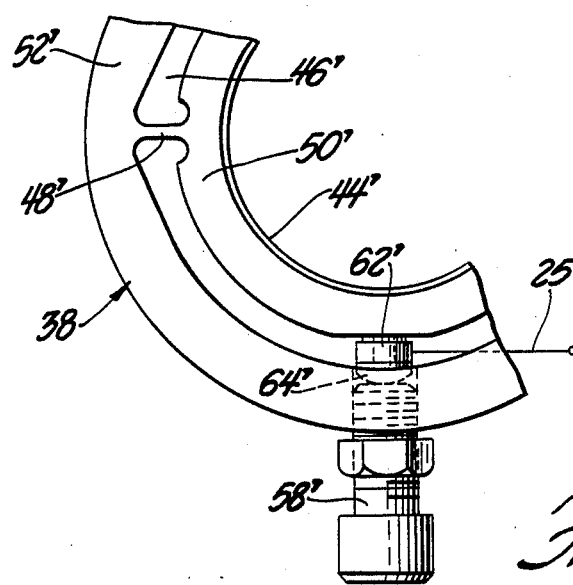
FIG. 5 is a partial top view of the lower suspension element of the suspension cartridge.

FIG. 3 shows, in cross section, the suspension cartridge 26 and the spindle cartridge 30 assembled to the support plate 12. The suspension cartridge 26 comprises an upper suspension plate 36 and a lower suspension plate 38 connected by a tubular spacer 40 which is secured to the plates 36, 38 by welding or by bolts to form a rigid structure. The upper suspension plate 36 (further shown in FIG. 4) is generally rectangular and has two opposed flanges 42 which extend beyond the aperture 28 in the plate 12 and which are securely bolted to the support plate 12. A central bore 44 in the plate 36 sized to snugly receive the spindle cartridge 30 is bracketed by two arcuate slots 46 which extend through the plate and nearly meet at each end to define two narrow webs 48 at diametrically opposed positions with respect to the bore 44. The arcuate slots 46 effectively divide the plate 36 into two regions interconnected by the webs 48: an inner ring 50 adjacent the bore 44 and an outer plate 52. The ends of the slots are enlarged by small radius corners connected by opposed straight line segments to extend the length of each web beyond the mean width of the slots 46. The webs thus are carefully designed to achieve a desired degree of resilience or spring rate. These webs 48 comprise the springs or flexure elements of the suspension plate 36. A transducer mounting is located at 90 degrees from the webs 48. There, a flat 54 is formed on the inner ring 50 and a bore 56 in the side of the outer plate 52 is threaded to accept a screw 58 which is secured by a locknut 60. A piezoelectric force transducer 62 located in the slot adjacent the bore is held against the flat and a preload force is applied by the screw 58 acting through a steel ball 64 in the bore 56. Instead of the ball 64, a convex washer 64', as shown in FIG. 5, having a flat side bearing against the transducer may be preferred. The preloaded transducer assembly then affects the spring rate and becomes a part of the suspension. The transducer 62 electrical output is connected to the lines 25.

The lower suspension plate 38, as shown in FIGS. 3 and 5, is functionally the same as the upper plate 36 except it does not have the mounting flanges so that the outer plate 52' is a ring. The slots 46' and the webs 48' are the same as the corresponding elements in the upper plate, and the inner ring 50' is also the same except that it has a slightly smaller bore 44'. The transducer 62' and its mounting are the same as in the upper plate. The webs 48 and 48' are aligned, i.e., they lie in the same diametrical plane of the bores 44 and 44'.

The spindle cartridge 30 primarily consists of the spindle 32, a rigid tubular housing 66, and bearings for rotatably supporting the spindle in the housing. The housing 66 is generally cylindrical but has small sloped steps on its outer surface to define a small diameter region 66a at its lower end, an intermediate diameter region 66b in the middle, and a slightly larger diameter region 66c near its top to facilitate its assembly into the suspension cartridge 26. The bore 44 of the upper suspension plate 36 and the large diameter region 66c are sized for a snug sliding fit, and the same is true of the bore 44' in the lower suspension element 38 and the intermediate diameter region 66b. Then the housing 66 can be slid into or out of the suspension cartridge but the fit is tight enough that no shaking occurs between the parts when an unbalanced part is rotated on the machine. For a hard suspension machine, the fit of the housing 66 in the cartridge 30 must maintain a high degree of stiffness. A radially extending flange 68 is provided near the top of the housing 66 for bolting to the inner ring 50 of the suspension plate 36. The top of the housing 66 terminates in an upper rim 70. The housing has a counterbore 72 at either end to receive tapered roller bearings 74 and 75.

The spindle 32 comprises a shaft 76 carrying a chuck mounting head 78 at the upper end. A recess 34 in the top of the head 78 affords a place to attach a chuck. A central air passage 80 extends along the shaft axis from the recess 34 to a lateral passage 82 passing diametrically through the shaft 76. A pair of seals 84 between the housing 66 and the shaft 76 on opposite sides of the lateral passage 82 defines a chamber 86 and a pressurized air fitting 88 in the side of the housing 66 couples with the chamber so that air is supplied through the spindle for chuck operation. Alternatively, the shaft 76 is drilled throughout its length and the pressurized air is supplied at the bottom of the shaft. An annular groove 90 in the under side of the head receives the upper rim 70 of the housing 66 for non-contact rotation therein to form a slinger to prevent dirt entry. Below the groove 90, a reduced diameter part of the shaft allows room between the shaft and the housing for a seal 92. The shaft diameter is reduced again below the seal 92 to define a shoulder 94 which seats against the inner race of the upper roller bearing 74. The lower roller bearing 75 resides near the lower end of the shaft 76 and within the lower counterbore 72. A threaded collar 96 on a threaded section 98 of the shaft 76 below the housing 66 bears upwardly against a spacer 100 surrounding the shaft which in turn bears upwardly against the bearing 75. The adjustment of the collar determines the preload on the bearings 74 and 75. A seal 102 secured at the lower opening of the housing 66 rides against the spacer 100. The region of the shaft 76 below the collar 96 affords a place to attach a pulley 20.

The spindle cartridge 30 has the advantage of being easily removed and assembled as a unit. It is necessary only to remove the pulley 20, the air fitting 88 and the retaining bolts to slide the cartridge 30 out of the suspension. This makes servicing or replacement of the unit very simple. A further important advantage of the cartridge structure is the tubular housing 66 which holds the bearings rigidly in alignment. This makes possible smooth repeatable operation of the balancing machine and is superior to bearing mountings attached to separate parts of the machine base.

The suspension cartridge 26 also has the advantage of being easily removed and assembled as a unit. In addition to removing the pulley 20 and the air fitting 88, it is necessary only to disconnect the wires 25 and the retaining bolts to remove the cartridge 26. The spindle cartridge 30 may be in place in the suspension during such handling of the suspension cartridge 26 or may be handled separately. The unique suspension elements 36, 38 and the integrated transducers 62, 62' provide a compact structure which is easily handled as a unit for servicing or replacement. The resilient webs on each side of the spindle and lying in the same plane yield a strong structure while acting as a spring in a direction transverse to the plane. With this arrangement the tension of a belt drive extending to a motor aligned in the plane of the webs does not significantly torque the webs or otherwise affect the transducer outputs. As a matter of design, the web sizes can be selected to provide the desired spring rate.

The embodiments of the invention in which an exclusive property or privilege is claimed are defined as follows:

1. A vertical balancing machine comprising;
   a base carrying a horizontal support plate having an aperture,
   a suspension cartridge secured to the support plate for assembly and removal as a unit and at least in part depending through the aperture,
   the suspension cartridge having a pair of vertically spaced, rigidly interconnected suspension elements, each suspension element having an associated transducer for sensing unbalance signals, and a vertical spindle journaled in a spindle support in the suspension elements,
   each suspension element comprising a suspension plate rigidly connected to the support plate, the suspension plate having an opening for receiving the spindle support and slot means in the suspension plate for enabling flexing between the opening and the support plate, and
   motor means supported on the base in driving relation to the spindle.

2. The invention as defined in claim 1 wherein the slot means in each suspension plate defines an outer plate connected to an inner ring through a pair of diametrically extending flexure elements on opposite sides of the ring, the inner ring containing the opening, and means for coupling the spindle to the inner ring.

3. The invention as defined in claim 2 wherein the motor means is coupled to the spindle by a belt drive, and the motor means and the flexure elements are mounted in the same diametrical plane of the spindle thereby minimizing the torsional effects of the belt drive on the unbalance signals.

4. The invention as defined in claim 1 wherein each suspension plate comprises an outer space radially spaced by the slot means form a centrally apertured inner ring and connected thereto through a pair of diametrically extending flexure elements on opposite sides of the ring,
- means for securing the transducer in the space between the outer plate and the ring at a point equally spaced from the flexure elements, and
- means for preloading the transducer resulting in a force between the outer plate and the ring, whereby the suspension stiffness depends upon the resilience of the flexure elements and the preloaded transducer.

5. A vertical balancing machine comprising;
- a base carrying a horizontal support plate having an aperture,
- a suspension cartridge secured to the support plate for assembly and removal as a unit and at least in part depending through the aperture,
- the suspension cartridge having a pair of vertically spaced, rigidly interconnected suspension elements, each suspension element having an associated transducer for sensing unbalance signals, and a vertical spindle journaled in the suspension elements, and
- motor means supported on the base in driving relation to the spindle,
- wherein the suspension elements have central apertures for receiving a spindle cartridge, and the spindle cartridge comprises a tubular housing which snugly fits within the central apertures, a spindle shaft, and a pair of spaced bearing means for mounting the spindle shaft within the housing.

6. A vertical balancing machine comprising:
- a base carrying a horizontal support plate having an aperture,
- a suspension cartridge secured to the support plate for assembly and removal as a unit and at least in part depending through the aperture,
- the suspension cartridge having a pair of vertically spaced, rigidly interconnected suspension elements, each suspension element having an associated transducer for sensing unbalance signals, and a vertical spindle cartridge secured in the suspension elements for assembly and removal as a unit, and
- motor means supported on the base in driving relation to the spindle cartridge, wherein the vertically spaced suspension elements define a pair of vertically spaced axially aligned apertures, and wherein the spindle cartridge comprises a rigid tube snugly mounted in the axially aligned apertures of the suspension elements, a spindle, a pair of vertically spaced bearings for rotatably supporting the spindle in the tube, and means for coupling the spindle to the motor means.

7. A vertical balancing machine comprising;
- a base carrying a horizontal support plate having an aperture,
- a suspension cartridge secured to the support plate for assembly and removal as a unit and at least in part depending through the aperture,
- the suspension cartridge having a pair of vertically spaced, rigidly interconnected suspension elements, each suspension element having an associated transducer for sensing unbalance signals, and a vertical spindle cartridge slidably secured in the suspension elements for assembly and removal as a unit, and
- motor means supported on the base in driving relation to the spindle cartridge,
- wherein each suspension element includes a plate with a central bore for receiving the spindle cartridge, a pair of arcuate slots through the plate and concentric with the bore for defining inner and outer plate portions and webs between the ends of the slots serving as flexure means, the webs of both suspension elements residing in a common diametrical plane of the bores.

* * * * *